(12) United States Patent
Kell et al.

(10) Patent No.: US 11,986,897 B2
(45) Date of Patent: May 21, 2024

(54) DEBRIS REMOVAL

(71) Applicant: ROLLS-ROYCE plc, London (GB)

(72) Inventors: James Kell, Nottingham (GB); Graeme E Rigg, Derby (GB); Shamraze Ahmed, Nottingham (GB); Monica M Castro Palacios, Nottingham (GB); Adam Clare, Nottingham (GB)

(73) Assignee: ROLLS-ROYCE plc, London (GB)

( * ) Notice: Subject to any disclaimer, the term of this patent is extended or adjusted under 35 U.S.C. 154(b) by 95 days.

(21) Appl. No.: 17/734,515

(22) Filed: May 2, 2022

(65) Prior Publication Data
US 2023/0020397 A1 Jan. 19, 2023

(30) Foreign Application Priority Data
May 20, 2021 (GB) ...................................... 2107236

(51) Int. Cl.
| | | |
|---|---|---|
| B23H 9/10 | (2006.01) | |
| B23K 26/035 | (2014.01) | |
| B23K 26/36 | (2014.01) | |
| B23K 101/00 | (2006.01) | |

(52) U.S. Cl.
CPC ............. B23H 9/10 (2013.01); B23K 26/035 (2015.10); B23K 26/36 (2013.01); *B23K 2101/001* (2018.08)

(58) Field of Classification Search
CPC .... B23K 26/035; B23K 26/36; B23P 2700/06
See application file for complete search history.

(56) References Cited

U.S. PATENT DOCUMENTS

| | | | | |
|---|---|---|---|---|
| 3,887,782 | A | * | 6/1975 | Wohlabaugh ............ B23H 7/18 219/69.16 |
| 5,216,808 | A | * | 6/1993 | Martus ............... B23K 26/0622 29/889.71 |
| 6,380,512 | B1 | * | 4/2002 | Emer ..................... F01D 5/005 219/121.85 |
| 6,800,829 | B1 | | 10/2004 | Nimmons |

(Continued)

FOREIGN PATENT DOCUMENTS

| | | |
|---|---|---|
| EP | 1 437 194 A2 | 7/2004 |
| EP | 1 941 965 A1 | 7/2008 |

(Continued)

OTHER PUBLICATIONS

Feb. 3, 2023 European Search Report issued in European Patent Application No. 22170213.7.

(Continued)

*Primary Examiner* — Eldon T Brockman
(74) *Attorney, Agent, or Firm* — Oliff PLC

(57) ABSTRACT

A method for the removal of debris (75) from an aperture (60), the aperture comprising a first aperture diameter (64) and extending along a first axis (62) over a first distance (63), the method comprising the steps of aligning a beam of energy (80) with the first axis such that the beam of energy is coaxially aligned with the aperture, the beam of energy comprising both an energy sufficient to remove the debris, and a first beam diameter (82) which is less than the first aperture diameter; and, exposing the debris to the beam of energy in order to remove the debris from the aperture.

15 Claims, 8 Drawing Sheets

(56) References Cited

U.S. PATENT DOCUMENTS

| | | | |
|---|---|---|---|
| 9,511,434 B2* | 12/2016 | Leao | B23H 7/26 |
| 9,561,555 B2* | 2/2017 | Koonankeil | B23H 1/00 |
| 2013/0248495 A1* | 9/2013 | Leao | B23H 1/10 |
| | | | 219/69.16 |
| 2014/0186164 A1* | 7/2014 | Koonankeil | F01D 5/187 |
| | | | 29/889.22 |

FOREIGN PATENT DOCUMENTS

| | | |
|---|---|---|
| EP | 2 345 499 A1 | 7/2011 |
| EP | 3 059 040 A1 | 8/2016 |
| EP | 3 467 256 A1 | 4/2019 |
| GB | 2 207 210 A | 1/1989 |
| WO | 2015/108858 A1 | 7/2015 |

OTHER PUBLICATIONS

Oct. 26, 2021 Combined Search and Examination Report issued in British Patent Application No. 2107236.8.

* cited by examiner

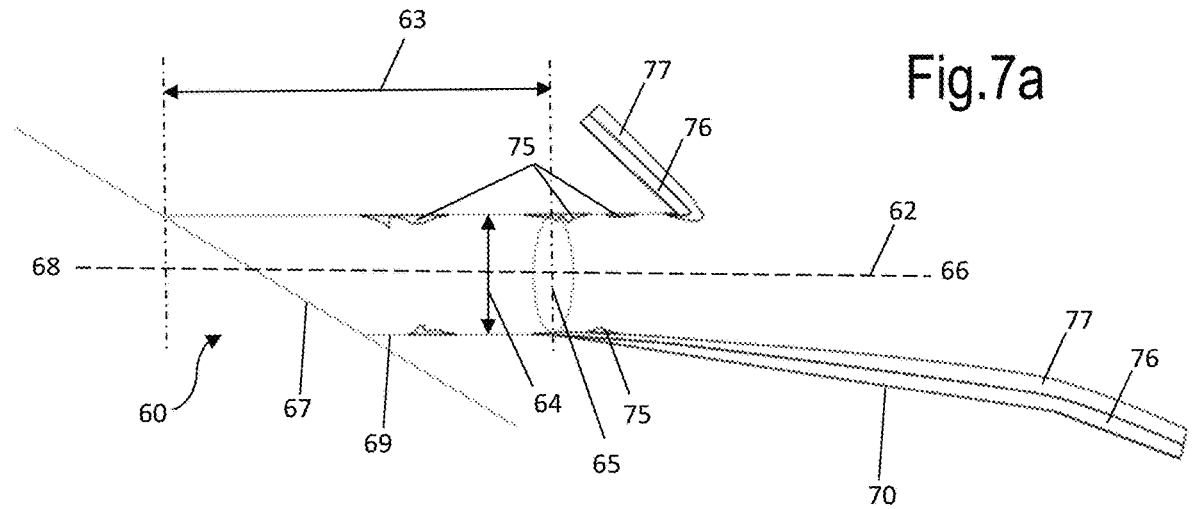
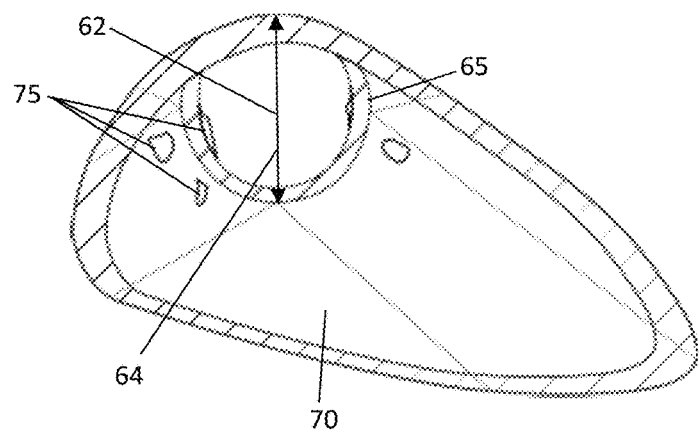
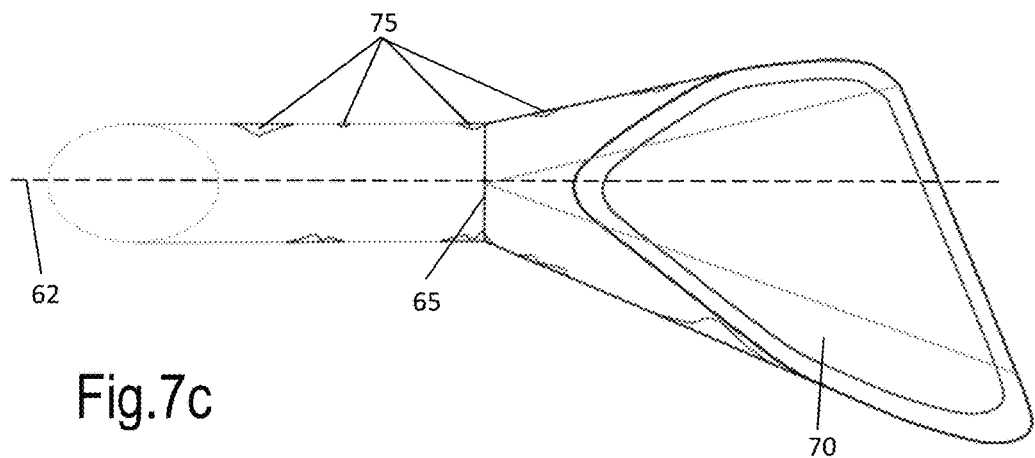

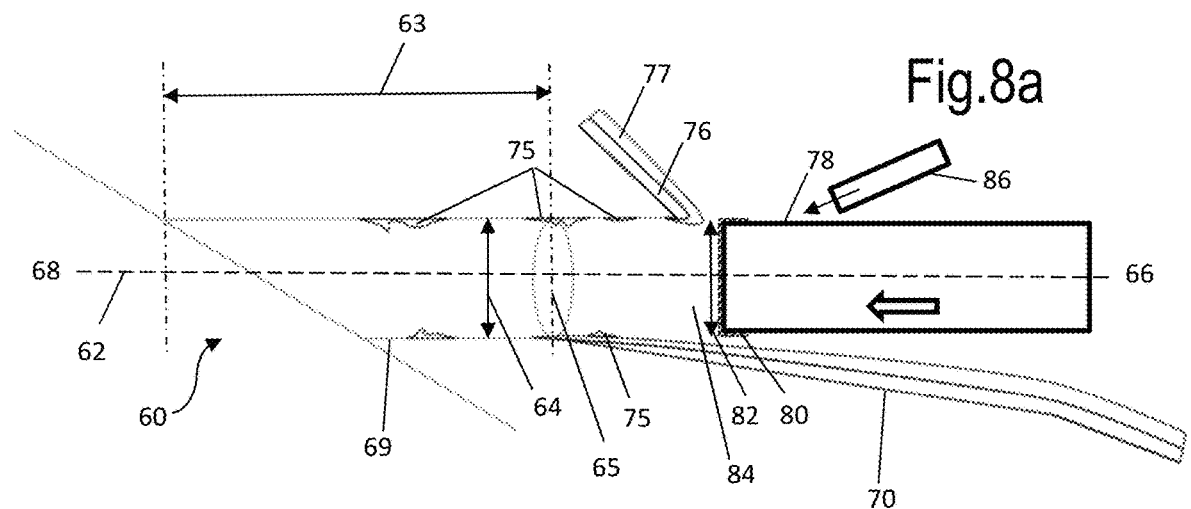
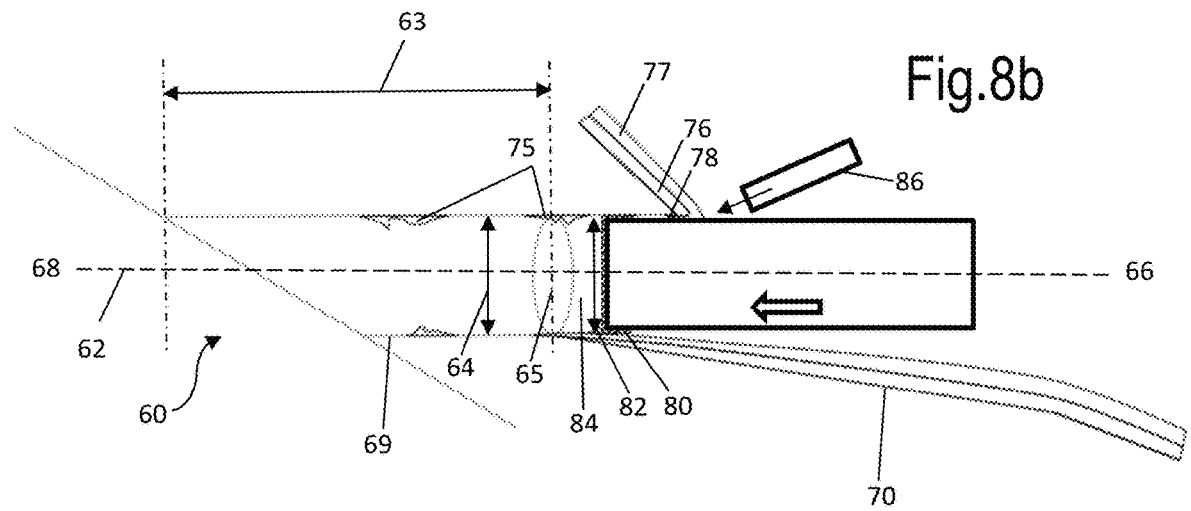
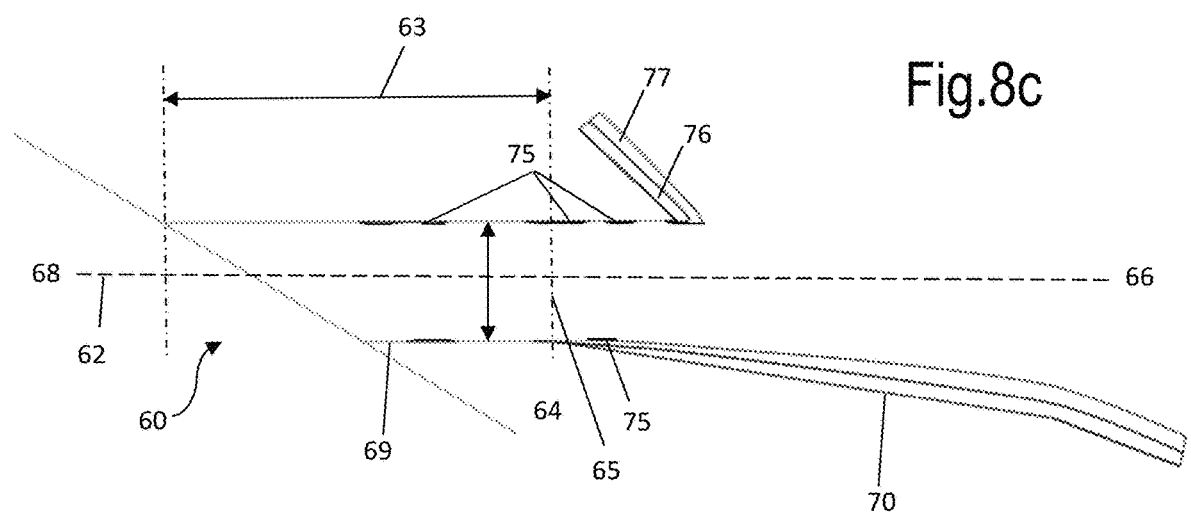

DEBRIS REMOVAL

BACKGROUND

Field of the Disclosure

The present disclosure relates to a method to remove debris from an aperture. In particular, the present disclosure relates to a method to remove debris from an aperture of an aerospace component. In addition, the present disclosure relates to a gas turbine engine comprising an aerospace component which has had debris removed according to the method disclosed.

Description of the Related Art

To increase operational efficiency of a gas turbine engine, it is common to seek methods to increase the internal working temperature. A traditional method for enabling such increased internal working temperature is to cool at least some of the components which experience high temperatures during operation, by use of cooling holes. Such cooling holes enable a relatively cool working fluid (i.e. a cooling fluid) to be fed through a relatively hot component, such that heat may be transferred from the component to the fluid to provide cooling.

A further method for enabling increased internal working temperatures is to apply a thermal barrier coating (TBC) at least some of the components which experience high temperatures during operation. TBCs are advanced ceramic coatings, which may be applied to gas turbine engine components, such as rotor blades and stator blades comprised within the turbine section. The function of TBCs is to provide thermal insulation from hot gas flowing, for example, through the turbine section. TBCs often consist of a two-layer coating system comprising an oxidation and corrosion resistant layer called the bond coat, and an insulating ceramic top layer called a top coat.

During manufacture of aerofoils for a gas turbine engine, it is common for cooling holes to be formed through a wall of a respective aerofoil before the application of a bond coat, followed by a subsequent top coat. In this way, it is possible for debris to accumulate either within a cooling hole, or over the entrance of a cooling hole, during the application of either or both of the bond coat and top coat. It is also possible for debris to accumulate either within a cooling hole, or over the entrance of a cooling hole, during use of the gas turbine engine.

It will be appreciated that should debris to accumulate either within a cooling hole, or over the entrance of a cooling hole, the cooling hole will become less effective at cooling due to a reduced flow of cooling fluid through the component. A reduced cooling efficiency may lead to either localised hotspots or large portions of the aerofoil operating at temperatures beyond the designed operational temperature limits. Such instances may accelerate degradation of the aerofoil, or the coating itself, which may lead to component failure.

Should debris accumulate either within a cooling hole, or over the entrance of a cooling hole, during manufacture, it may be required to remove the debris. However, such operations must be conducted in a manner which ensures that the aerofoil and surrounding coating is not damaged, and that the component remains within strict tolerance margins. Thus, the original equipment used to form the holes may not be appropriate for use. Instead, should debris accumulate either within a cooling hole, or over the entrance of a cooling hole, during use, it may also be required to remove the debris. However, it may then be required to remove the component from the engine in order to remove the debris, which may reduce the operational service life of the gas turbine engine and increase service costs as a result.

Thus, a method for the removal of debris from an aerospace engine component is required, which solves at least some of the aforementioned problems.

SUMMARY

According to a first aspect there is provided a method for the removal of debris from an aperture, the aperture comprising a first aperture diameter and extending along a first axis over a first distance, the method comprising the steps of aligning a beam of energy with the first axis such that the beam of energy is coaxially aligned with the aperture, the beam of energy comprising both an energy sufficient to remove the debris, and a first beam diameter which is less than the first aperture diameter; and, exposing the debris to the beam of energy in order to remove the debris from the aperture.

The aperture may be provided through a substrate. The first distance may be equal to a thickness of the substrate. Thus, the aperture may extend entirely through the substrate. The first distance may vary according to the thickness of the substrate. The aperture may be provided within the substrate. The first distance may be less than a thickness of the substrate. Thus, the aperture may extend partially through the substrate. Alternatively, a second or further portion of the aperture may ensure that the aperture is provided through a substrate over a second or further distance. Further alternatively, the aperture may extend partially through the substrate. Alternatively, the first distance may be greater than a thickness of the substrate. Thus, the aperture may be canted away from a normal direction through the substrate.

The aperture may be provided through an exterior wall of the substrate. The aperture may be provided within an exterior wall of the substrate. The aperture may be provided through an interior wall of the substrate. The aperture may be provided within an interior wall of the substrate. Thus, the aperture may be a hole located within the substrate. The aperture may be a channel located within the substrate. The aperture may be a recess, trench, or groove located within the substrate. The aperture may be a cooling hole located within the substrate. The aperture may be a hole formed through the substrate. The aperture may be a cooling hole formed through the substrate. In some examples, the aperture may be an oil feed orifice. In some examples, the aperture may be a labyrinthine fuel orifice.

The aperture may be, for example, suitable for the delivery of one or more of air, oil, or a working fluid to an area of interest comprised within one or more of a gas turbine engine, an engine, an airframe, or a nuclear reactor.

The aperture may comprise a second aperture diameter. The aperture may extend along the first axis over a second distance. The method may comprise the steps of aligning a beam of energy with the first axis such that the beam of energy is coaxially aligned with the aperture. The aperture may extend along a second axis over a second distance. The method may comprise the steps of aligning a beam of energy with the second axis such that the beam of energy is coaxially aligned with the aperture. The beam of energy may comprise a second beam diameter which is less than the second aperture diameter. The aperture may comprise a third or further aperture diameter. The aperture may extend along the first or second axis over a third or further distance. The aperture may extend along a third or further axis over a third or further distance. The second or further distance may vary according to the thickness of the substrate.

The method may comprise the step of maintaining the energy comprised within the beam at a substantially constant level, according to a predetermined condition. Alternatively, the method may comprise the step of varying the energy comprised within the beam, according to a predetermined condition.

The predetermined condition may vary according to one or more of the substrate, substrate type, substrate material, quantity of debris, debris material, debris materials, maximum energy input tolerances, or minimum energy input tolerances, and time requirements to achieve the removal of debris from the aperture.

The debris may be at least partially contained within the aperture. The step of exposing the debris to the beam of energy may include the step of removing the debris from within the aperture.

The debris may at least partially block the aperture. By at least partially blocking the aperture, the debris may extend towards the first or subsequent axis from a sidewall of the aperture. In this way, the debris may partially block the aperture. The debris may at least substantially block the aperture. The debris may completely block the aperture.

At least a portion of the debris may at least partially cover an entrance of the aperture. The step of exposing the debris to the beam of energy may include the step of removing the debris from an entrance into the aperture.

The aperture may comprise a first entrance at a first end thereof. The aperture may comprise a second entrance at a second end thereof. Thus, the debris may at least partially block an entrance of the aperture. By at least partially blocking the aperture, the debris may extend towards the first or subsequent axis from an entrance of the aperture. In this way, the debris may partially block the aperture. The debris may at least substantially block the aperture. The debris may completely block the aperture.

The debris may be located at one or more locations along the first axis. Thus, in some examples, there may be only one instance of debris. The debris may be located at any point along the first or subsequent axis. Thus, the debris may be located at any single location along the length of the aperture. In some examples, there may be two or more instances of debris. The debris may be located at any two or more points along the first or subsequent axis. Thus, the debris may be located at any two or more locations along the length of the aperture.

The debris may comprise a thermal barrier coating. The debris may comprise a ceramic. The thermal barrier coating may comprise a yttria-stabilised zirconia (YSZ). Additionally or alternatively, the thermal barrier coating may comprise one or more of mullite; alumina; $CeO_2$ (Ceria)+YSZ; rare earth zirconiates; rare earth oxides, and metal-glass composites, as known within the art.

The debris may comprise a bond coat for a thermal barrier coating. The bond coat may comprise a metal. The bond coat may be metallic. The bond coat may comprise either a NiCrAlY or a NiCoCrAlY alloy. The bond coat may comprise a precious metal. The bond coat may comprise platinum. The bond coat may comprise either or both of nickel and platinum aluminides.

The substrate may comprise a plurality of apertures. Each respective aperture may comprise a first aperture diameter and extend along a first axis over a first distance.

The substrate may comprise one or more rows of apertures. For example, there may be provided a substrate comprising one row of apertures. There may be provided a substrate comprising two rows of apertures. There may be provided a substrate comprising three rows of apertures. There may be provided a substrate comprising four or more rows of apertures. Each row of apertures may be configured relative to a spanwise direction of the substrate. Each row of apertures may be at least partially aligned with a spanwise direction of the substrate. Each row of apertures may be at least substantially aligned with a spanwise direction of the substrate.

The method may be completed for each aperture which is at least partially blocked by the debris.

The step of aligning the beam of energy with the first axis may include aligning the beam with the first axis of any one of the one or more of the respective apertures. The debris may be removed from each of the respective apertures sequentially. Thus, debris may be removed from one or more of the respective apertures in a preferred sequence or order. The debris may be removed from two or more of the respective apertures concurrently.

Thus, there may be provided a tool or configuration comprising a single beam of energy, which may be aligned with any one of the apertures, such that debris may be removed from one or more apertures in a sequential order. Alternatively, there may be provided a tool or configuration comprising two or more beams of energy, each of which may be aligned with the first axis of any one of the one or more of the respective apertures. In this way, debris may be removed from two or more apertures at the same time.

The first aperture diameter of the or each aperture may be at least substantially constant over at least a substantial portion of the first distance. In some examples, the first aperture diameter of the or each aperture may be at least substantially continuous along the first axis. The first aperture diameter of the or each aperture may be at least substantially continuous along the entire length of the aperture. In some examples, the first aperture diameter of the or each aperture may be at least substantially continuous along the entire length of the aperture, apart from an increase in diameter at or adjacent to either or both of the first entrance at the first end, and the second entrance at the second end. In further examples, the first aperture diameter of the or each aperture may be non-continuous along the length of the aperture. In this way, the first aperture diameter of the or each aperture may vary along the first axis. In some examples, the first aperture diameter of the or each aperture may be continuously variable along the hole length.

The second aperture diameter of the or each aperture may be at least substantially constant over at least a substantial portion of the second distance. In some examples, the first aperture diameter is equivalent to the second aperture diameter. In some examples, the first aperture diameter is at least substantially equivalent to the second aperture diameter. In some examples, the second aperture diameter of the or each aperture may be at least substantially continuous along the second axis. In further examples, the second aperture diameter of the or each aperture may be at least substantially continuous along the second axis, apart from an increase in diameter at or adjacent to either or both of the first entrance at the first end, and the second entrance at the second end. In further examples, the second aperture diameter of the or each aperture may be non-continuous along the second axis. In this way, the second aperture diameter of the or each aperture may vary along the second axis. In some examples, the second aperture diameter of the or each aperture may be continuously variable along the second axis.

The first beam diameter may be between about 0.02 mm to about 6 mm less than the first aperture diameter. In some examples, the first beam diameter may be between about 0.2 mm to about 2 mm less than the first aperture diameter. In further examples, the first beam diameter may be between about 0.4 mm to about 1.2 mm less than the first aperture diameter. For example, the first beam diameter may be about 0.8 mm less than the first aperture diameter. Thus, there may be provided a substantially constant 0.4 mm gap between the tool and the cooling hole sidewall.

The second beam diameter may be between about 0.02 mm to about 6 mm less than the second aperture diameter. In some examples, the second beam diameter may be between about 0.2 mm to about 2 mm less than the second aperture diameter. In further examples, the second beam diameter may be between about 0.4 mm to about 1.2 mm less than the second aperture diameter. For example, the second beam diameter may be about 0.8 mm less than the second aperture diameter. Thus, there may be provided a substantially constant 0.4 mm gap between the tool and the cooling hole sidewall.

The beam of energy may be provided via a tool. The tool may be a probe. The tool may be elongate. The tool may comprise a tip. The tip may comprise a planar end. Thus, the tip may comprise a substantially flat end. The tip may comprise a rounded end. The tip may comprise a profiled end. The profiled end may comprise a chamfered profile. The profiled end may comprise a tapered profile. The profiled end may comprise a rounded profile. The profiled end may terminate at a pointed profile. The profiled end may terminate at a rounded profile. The profiled end may terminate at a chamfered profile. The profiled tip may terminate at a tapered profile. It will be appreciated that the specific tool, and profile of the tool, may vary according to one or more of, for example, the beam of energy, the substrate material, the first aperture diameter, and the first distance.

The beam of energy may project between about 0.01 mm to about 3 mm from the tool. In some examples, the beam of energy may project between about 0.1 mm to about 1 mm from the tool. In further examples, the beam of energy may project between about 0.2 mm to about 0.6 mm from the tool. For example, the beam of energy may project about 0.4 mm from the tool. Thus, the beam of energy may project from either or both of a tip and a sidewall of the tool. Accordingly, the beam of energy may project from either or both of the tip and the sidewall of the tool over a distance less than or equal to the first distance.

The method may comprise the step of advancing the tool into the aperture along the first axis. The method may comprise the step of advancing the tool into the aperture along the second or further axis.

The step of advancing the tool into the aperture may occur either or both of before and during the step of exposing the debris to the beam of energy. It will be appreciated that the specific rate of advancing the tool into the aperture may vary according to one or more of, for example, the beam of energy, the substrate material, the first aperture diameter, and the first distance.

The step of advancing the tool into the aperture may comprise the step of oscillating the tool within the aperture along the first axis. The step of advancing the tool into the aperture may comprise the step of oscillating the tool within the aperture along the second or further axis.

The step of oscillating the tool within the aperture may occur either or both of before and during the step of exposing the debris to the beam of energy. By oscillating, the tool may be either or both of advanced and withdrawn or rotated about the first or further axis in a cyclic fashion, according to a predetermined condition. It will be appreciated that the specific rate of oscillation may vary according to one or more of, for example, the beam of energy, the substrate material, the first aperture diameter, and the first distance.

The step of advancing the tool into the aperture may comprise the step of rotating the tool within the aperture about the first axis. The step of advancing the tool into the aperture may comprise the step of rotating the tool within the aperture about the second or further axis.

The step of rotating the tool within the aperture may occur either or both of before or during the step of exposing the debris to the beam of energy. By rotating, the tool may be rotated about the first or further axis in a reciprocating twist or a continuously rotating fashion, according to a predetermined condition. It will be appreciated that the specific rate of rotation may vary according to one or more of, for example, the beam of energy, the substrate material, the first aperture diameter, and the first distance.

The tool may be an electro discharge machining (EDM) tool. Thus, the beam of energy may be provided in the form of an electrical discharge. The electrical discharge may be in the form of one or more of a potential difference, a current discharge, and an electric arc. Thus, the beam of energy may be provided in the form of an arc. The beam of energy may be provided in the form of, for example, a series of rapidly recurring current discharges between two or more electrodes, separated by a dielectric liquid, and subject to an electric voltage.

The beam of energy may comprise an on time of between about 1 µs to about 70 µs. In some examples, the beam of energy may comprise an on time of between about 10 µs to about 40 µs. In further examples, the beam of energy may comprise an on time of between about 20 µs to about 30 µs. For example, the beam of energy may comprise an on time of 25 µs. The beam of energy may comprise an off time of between about 1 µs to about 500 µs. In some examples, the beam of energy may comprise an off time of between about 10 µs to about 50 µs. In further examples, the beam of energy may comprise an off time of between about 15 µs to about 25 µs. For example, the beam of energy may comprise an off time of 20 µs. The beam of energy may comprise a current of between about 0.1 A to about 100 A. In some examples, the beam of energy may comprise a current of between about 1 A to about 50 A. In further examples, the beam of energy may comprise a current of between about 5 A to about 25 A. For example, the beam of energy may comprise a current of 10 A. The beam of energy may comprise a gap voltage of between about 0.1V to about 100V. In some examples, the beam of energy may comprise a gap voltage of between about 1V to about 50V. In further examples, the beam of energy may comprise a gap voltage of between about 12V to about 48 A. For example, the beam of energy may comprise a gap voltage of 24 v. In some examples, the beam of energy may comprise a negative polarity. In further examples, the beam of energy may comprise a positive polarity.

The dielectric liquid may be provided into the aperture around the tool during the step of advancing the tool into the aperture. The dielectric liquid may be provided into the aperture via the tool during the step of advancing the tool into the aperture. In some examples, the dielectric liquid may be supplied into the aperture through a channel or orifice formed through the tool. The dielectric liquid may comprise deionized water, or an ionic liquid. Alternatively, the dielectric liquid may comprise a petroleum jelly. The petroleum jelly may be provided within the aperture prior to the step of advancing the tool into the aperture, or may be provided either on or via the tool during the step of advancing the tool into the aperture. Thus, the step to remove the debris may be achieved by electrical discharge erosion. In this way, the debris may be removed from the aperture, following the step to remove the debris, within a flow of dielectric liquid flowing through the aperture.

The beam of energy may be in the form of a laser. Thus, the beam of energy may be provided in the form of focussed electromagnetic radiation.

The step to remove the debris may be achieved by ablation. The step to remove the debris may be achieved by either or both of melting and vaporisation. In some examples, the step to remove the debris may be achieved by ablation. In this way, the debris may be removed from the aperture, following the step to remove the debris, within a flow of fluid flowing through the aperture. The fluid may be a liquid. The fluid may be water or an aqueous-based coolant. The fluid may be a gas. The fluid may be air.

The beam of energy may be in the form of a jet of fluid. Thus, the beam of energy may be provided in the form of a jet of water. Accordingly, the step to remove the debris may be achieved by physically dislodging the debris. In this way, the pressure of the water comprised within the jet may be sufficient to physically dislodge the debris and remove it from the aperture. Additionally or alternatively, the step to remove the debris may be achieved by mechanical drilling. In this way, the debris may be removed from the aperture, following the step to remove the debris, within a flow of fluid flowing through the aperture. The fluid may be a liquid. The fluid may be water or an aqueous based coolant. The fluid may be a gas. The fluid may be air.

The substrate may be an aerospace component. Thus, the substrate may be, for example, an aerospace component located, in use, within a gas turbine engine. The substrate may be an aerofoil. The substrate may be a rotor blade. The substrate may be a compressor blade. The substrate may be a turbine blade. The substrate may be a stator. The substrate may be a vane. The substrate may be a guide vane, for example, a nozzle guide vane. In further examples, the substrate may be, for example, a component forming a component part of the combustor section of the gas turbine engine, a fuel spray nozzle, or a combustor retaining ring.

According to a second aspect there is provided a substrate comprising an aperture from which debris has been removed according to the method of the first aspect.

According to a third aspect there is provided a gas turbine engine for an aircraft comprising an engine core comprising a turbine, a compressor, and a core shaft connecting the turbine to the compressor; a fan located upstream of the engine core, the fan comprising a plurality of fan blades; and, a gearbox that receives an input from the core shaft and outputs drive to the fan so as to drive the fan at a lower rotational speed than the core shaft; wherein the gas turbine engine comprises a substrate comprising an aperture from which debris has been removed according to the first aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38, 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all values being dimensionless).

The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$s, 105 Nkg$^{-1}$s, 100 Nkg$^{-1}$s, 95 Nkg$^{-1}$s, 90 Nkg$^{-1}$s, 85 Nkg$^{-1}$s or 80 Nkg$^{-1}$s. The specific thrust may be in an inclusive range bounded by any two of the values in the previous sentence (i.e. the values may form upper or lower bounds), for example in the range of from 80 Nkg$^{-1}$s to 100 Nkg$^{-1}$s, or 85 Nkg$^{-1}$s to 95 Nkg$^{-1}$s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BREIF DESCRIPTION OF THE DRAWINGS

Embodiments will now be described by way of example only, with reference to the Figures, in which:

FIG. 6b shows a rear perspective view of the aperture of FIG. 6a;

FIG. 6c shows a top perspective view of the aperture of FIG. 6a;

FIG. 7a shows a side sectional view of an aperture, inclusive of debris;

FIG. 7b shows a rear perspective view of the aperture of FIG. 7a;

FIG. 7c shows a top perspective view of the aperture of FIG. 7a;

FIG. 8a shows a side sectional view of the aperture of FIG. 7a, and a tool aligned with the aperture;

FIG. 8b shows a side sectional view of the aperture of FIG. 8a, wherein the tool has been at least partially advanced into the aperture;

FIG. 8c shows a side sectional view of the aperture of FIG. 8a, wherein the tool has been removed from the aperture; and, FIG. 9 shows a flow diagram outlining steps to remove debris from an aperture.

DETAILED DESCRIPTION OF THE DISCLOSURE

Figure 1:
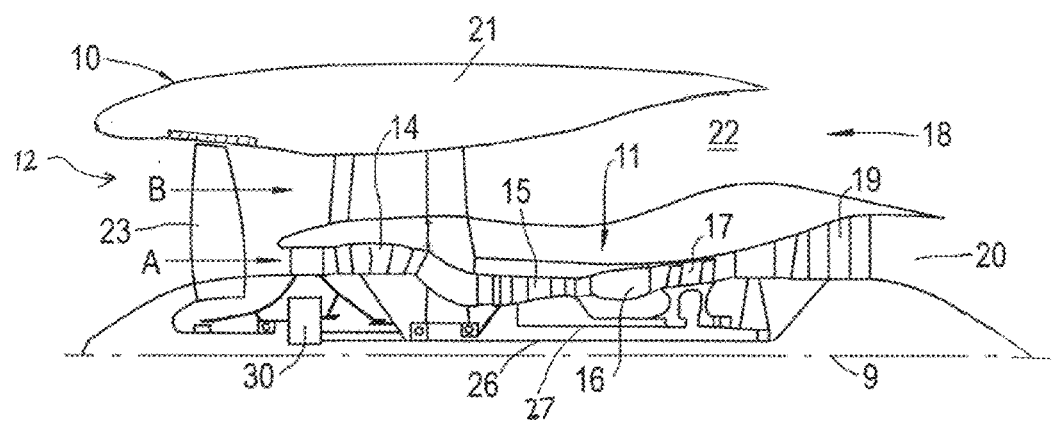
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
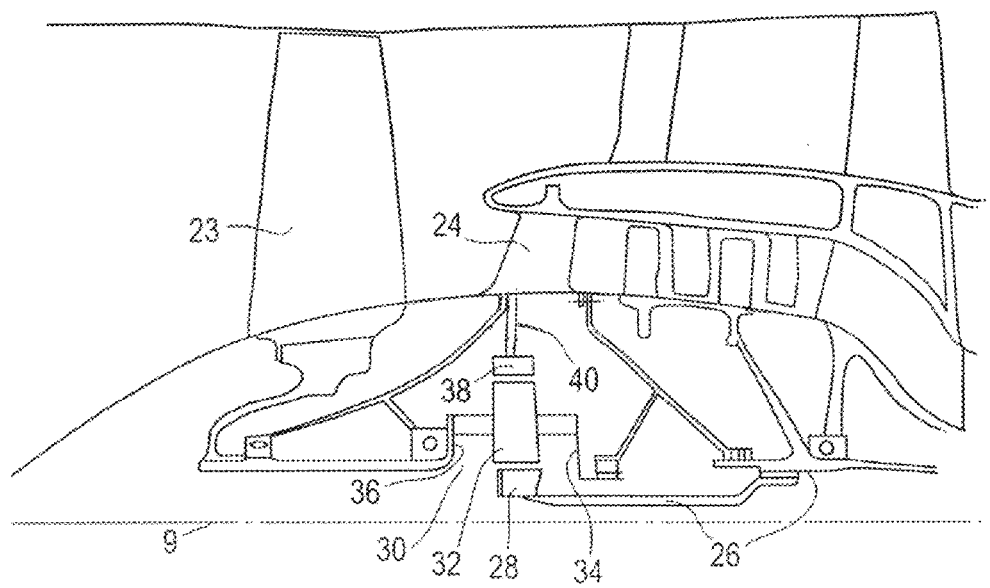
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
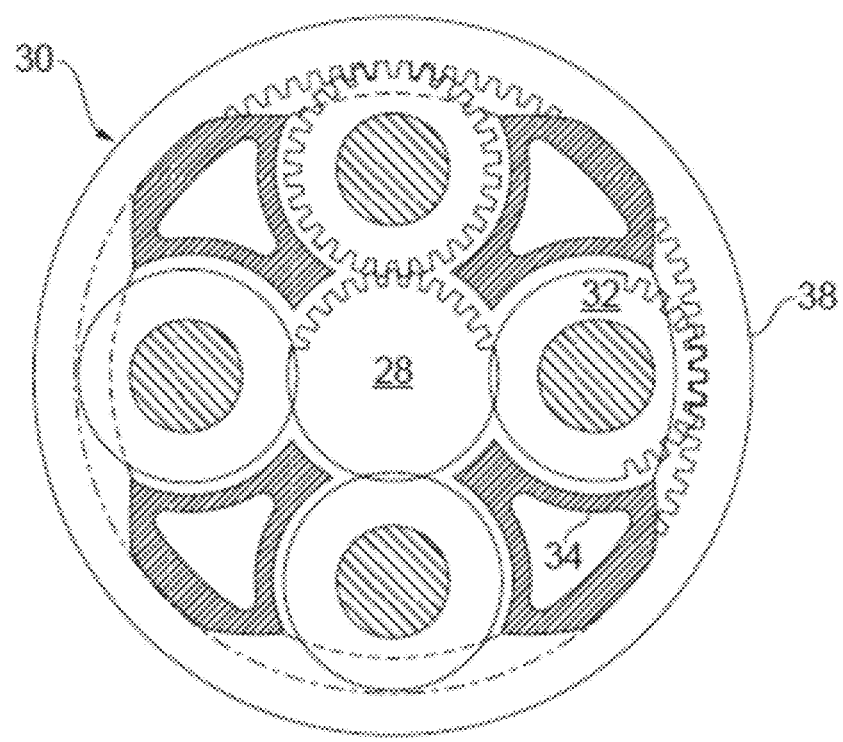
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular, with upstream and downstream, in relation to the core airflow A and the bypass airflow B. Chord relates to the separation between the leading edge and trailing edge of an aerofoil, and span is used in relation to the radial extent of the aerofoil. The stagger angle is the angle between the aerofoil chord line and principal rotational axis 9 of the engine.

The performance of gas turbine engines, whether measured in terms of efficiency or specific output, may be improved by increasing the turbine gas temperature. It may therefore be desirable to operate the turbines 17,19 at the highest possible temperatures. For any engine cycle compression ratio or bypass ratio, increasing the turbine entry gas temperature produces more specific thrust (e.g. engine thrust per unit of air mass flow). However, as turbine entry temperatures increase, the life of an un-cooled turbine blade or guide vane falls, necessitating the development of better materials and the introduction of internal air cooling.

In modern engines, the high-pressure turbine gas temperatures are hotter than the melting point of the material of either or both of the blades and vanes, necessitating internal air cooling of these aerofoil components. During its passage through the engine, the mean temperature of the gas stream decreases as power is extracted. Therefore, the need to cool the static and rotary parts of the engine structure decreases as the gas moves from the high-pressure stage(s) 17, through intermediate-pressure (where present) and low-pressure stages 19, and towards the core engine nozzle 20.

Figure 4:
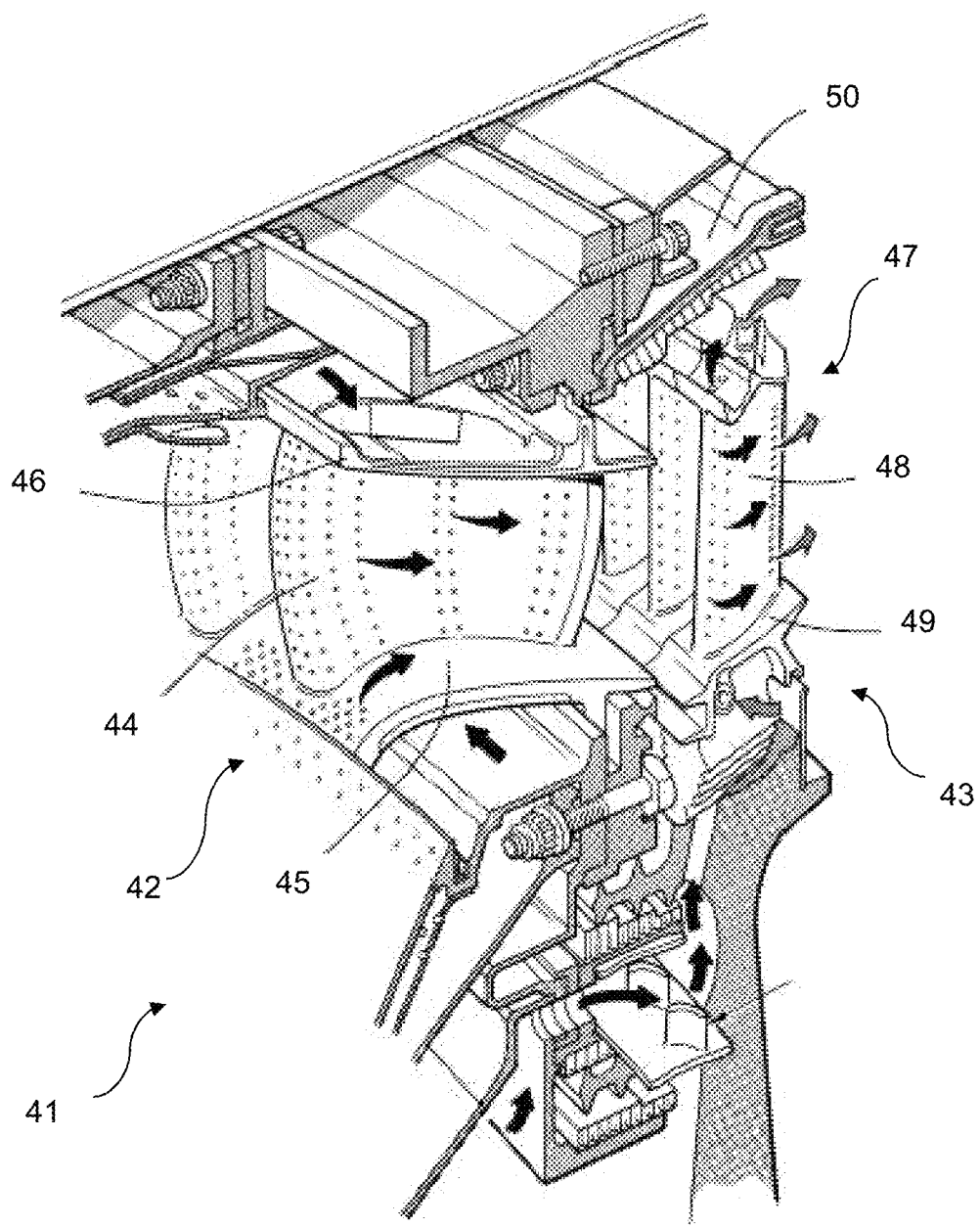
FIG. 4 shows an isometric view of a typical single stage cooled turbine.

FIG. 4 shows an isometric view of a single stage cooled turbine 41 in which there is a nozzle guide vane 42 in flow series with a turbine rotor 43. The nozzle guide vane includes an aerofoil 44 which extends radially between inner 45 and outer 46 platforms. The turbine rotor 43 includes a turbine blade 47 mounted to the peripheral edge of a rotating disc. The turbine blade 47 includes an aerofoil 48 which extends radially outwards from an inner platform 49. The radially outer end of the turbine blade 47 includes a shroud which sits within a seal segment 50. The seal segment 50 is a stator component and attached to the engine casing. The arrows in FIG. 2 indicate cooling flows.

The high-pressure turbine aerofoils are cooled by using high pressure air from the compressor that has by-passed the combustor and is therefore relatively cool compared to the gas temperature. Typical cooling air temperatures are between 800 and 1000 K, while gas temperatures can be in excess of 2100 K.

Internal convection and external films are the prime methods of cooling the gas path components—aerofoils, platforms, shrouds and shroud segments etc. The internal and external cooling air is delivered by a plurality of conduits, passages, or holes, which extend from the respective compressor stage to a point of delivery local to the component in question. From there, the cooling air is channelled through the air-cooled component via internal passageways before being exited at a desired location.

Figure 5:
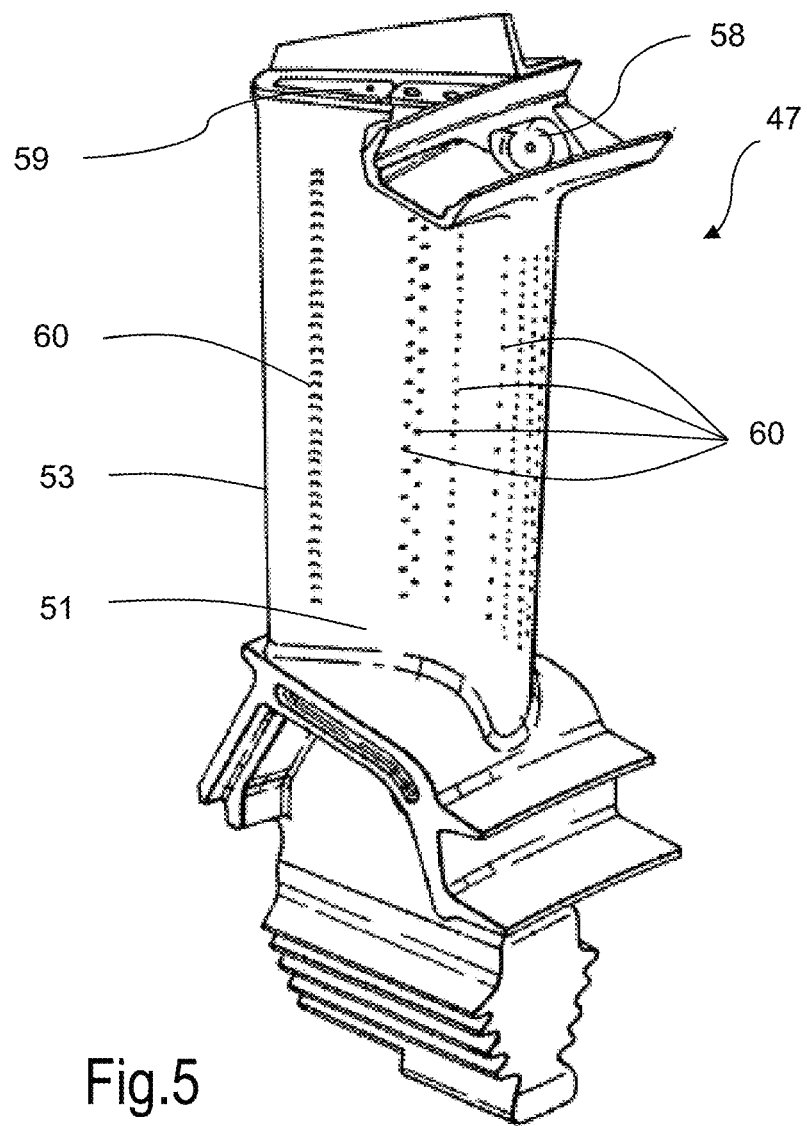
FIG. 5 shows an isometric view of the single stage cooled turbine shown in FIG. 4.

Referring to FIG. 5, which shows an isometric view of the turbine blade 47 shown in FIG. 4, external cooling is typically provided via film cooling holes 60 on a pressure surface 51, along the radial extent of the trailing edge 53, along shroud edge faces 58 and from the radial periphery of the blade 59. As shown in FIG. 5, film cooling holes 60 may be arranged in one or more rows extending in a spanwise direction of the turbine blade 47. Thus, each row of cooling holes 60 may be configured relative to a spanwise direction of the turbine blade 47. Thus, the cooling holes 60 are at least partially aligned with a spanwise direction of the turbine blade 47.

The arrangement of cooling holes 60 within the turbine blade 47 is established to provide a delivery of the cooling air to the requisite locations whilst providing internal cooling. Further, the cooling holes 60 must be accommodated within the body of the turbine blade 47 without compromising the resilience of the component.

The provision of internal cooling and external cooling is well known in the art, and the arrangement of cooling holes 60 has been the subject of extensive research and development for many years.

Figure 6A:
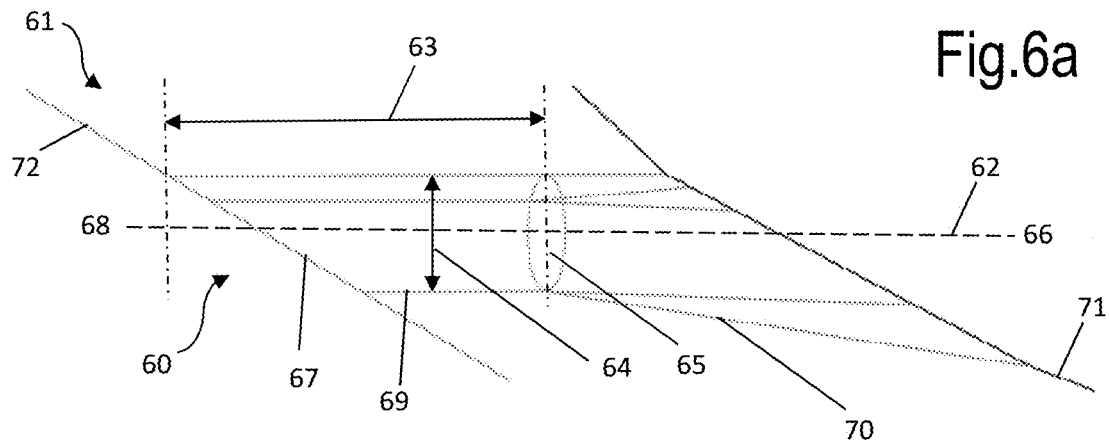
FIG. 6a shows a side sectional view of an aperture provided through a substrate.

FIG. 6a shows a side sectional view of an aperture provided through a substrate. In the non-limiting example shown, the substrate is an exterior wall 61 of a turbine blade 47 of the type shown in FIGS. 4 and 5. Thus, in the example shown, the aperture is a cooling hole 60, viewed through the exterior wall 61 of the turbine blade 47. The cooling hole 60 comprises a first aperture diameter 64 and extends along a first axis 62 over a first distance 63. In the example shown, the first distance 63 is representative of the hole length. In some examples, the cooling hole 60 may extend in a normal direction relative to the wall 61. Thus, the first distance 63 may be equal to or less than a thickness of the substrate. In further examples, such as the example shown in FIG. 6a, the cooling hole 60 may be canted away from the normal direction relative to the wall 61, in either or both of the chordwise direction and the spanwise direction of the aerofoil. Thus, the first distance 63 may be greater than a thickness of the substrate. In each of the above specified examples, the aperture is provided through the substrate. Thus, in the example shown, the cooling hole 60 extends through the wall 61 from an internally facing surface 72 of the wall 61 to either an externally facing surface 71 of the wall 61, or a point proximal to the externally facing surface 71 of the wall 61.

The cooling hole 60 comprises a cooling hole sidewall 69, and a first aperture diameter 64 taken through, and in a direction normal to, the first axis 62, over the first distance 63. The first aperture diameter 64 extends between opposing portions of the cooling hole sidewall 69 within the first distance 63.

The cooling hole 60 comprises a first entrance 65 at a first end 66 thereof. As shown, the cooling hole 60 terminates at the first entrance 65, which is itself formed through a recessed or trenched portion 70 formed within the externally facing surface 71 of the wall 61. The recessed or trenched portion 70 formed within the wall 61 forms an expansion of the cooling hole 60, such that the diameter of the recessed or trenched portion 70 is greater than that of the cooling hole 60 over the first distance 63. Thus, the cooling hole 60 shown exits into the recessed or trenched portion 70, such that cooling air may flow sequentially through the cooling hole 60 and the recessed or trenched portion 70 formed within the exterior wall 61, before exiting the turbine blade 47. In further examples, the cooling hole 60 may itself be formed through the externally facing surface 71 of the wall 61. Thus, the cooling air may flow sequentially through the cooling hole 60, before exiting the turbine blade 47.

The cooling hole 60 also comprises a second entrance 67 at a second end 68 thereof. As shown, the cooling hole 60 terminates at the second entrance 67, which is itself formed through the internally facing surface 72 of the wall 61. Thus, cooling air may flow sequentially through the cooling hole 60 and the recessed or trenched portion 70 formed within the exterior wall 61, before exiting the turbine blade 47. In further examples, the second entrance 67 may itself be formed within a recessed or trenched portion formed within the internally facing surface 72 of the wall 61. The recessed or trenched portion formed within the wall 61 may form an expansion of the cooling hole 60, such that the diameter of the recessed or trenched portion is greater than that of the cooling hole 60 over the first distance 63. Thus, the cooling air may flow sequentially through the recessed or trenched portion formed within the wall 61, before flowing through the cooling hole 60.

In the example shown, the first aperture diameter 64 is shown to remain constant along the first distance 63. Alternatively, the first aperture diameter 64 may be at least substantially constant along the first distance 63. Additionally or alternatively, the first aperture diameter 64 may be at least substantially constant over at least a substantial portion of the first distance 63. In further examples, the first aperture diameter 64 of the cooling hole 60 may vary over the first distance 63. In further examples, the first aperture diameter 64 of the cooling hole 60 may vary continuously over the first distance 63.

In some examples, the aperture may comprise a second or further aperture diameter. The aperture may extend along the first axis over a second or further distance. In further examples, the aperture may comprise a second or further axis, such that that the aperture extends along a second or further axis over a second or further distance. Thus, the second or further axis may be canted relative to the first axis 62.

Figure 6B:
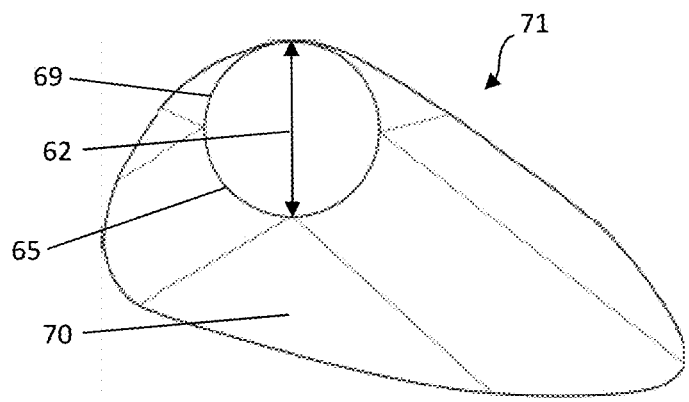

FIG. 6b shows a rear perspective view of the cooling hole 60, viewed from the first entrance 65 along the first axis 62, and the recessed or trenched portion 70 formed within the externally facing surface 71 of the wall 61. FIG. 6b also shows the opposing portions of the cooling hole sidewall 69. As shown, the recessed or trenched portion 70 formed within the wall 61 forms an expansion of the cooling hole 60, such that the diameter of the recessed or trenched portion 70 is greater than that of first aperture diameter 64. Thus, the diameter of the recessed or trenched portion 70 may increase over that of the first aperture diameter 64 in one or more directions both normal to, and relative to, the axis 62.

Figure 6C:
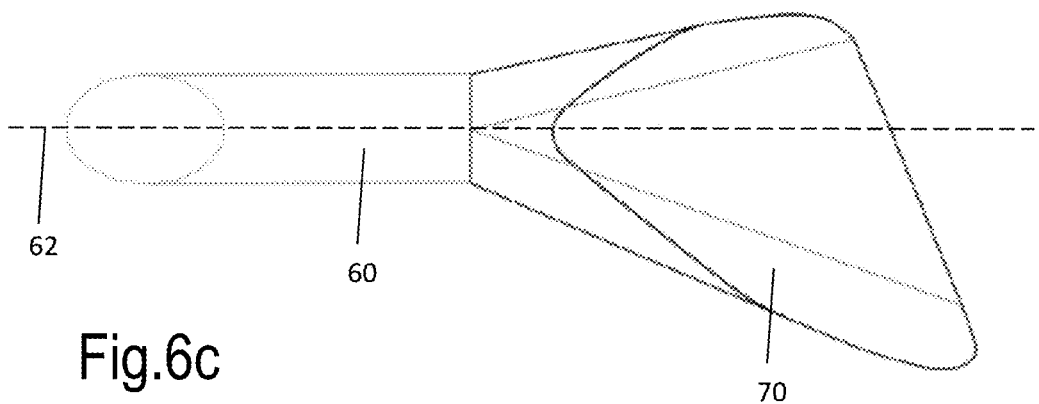

FIG. 6c shows a top perspective view of the cooling hole 60 and first axis 62, and the recessed or trenched portion 70 formed within the externally facing surface 71 of the wall 61. As shown, the recessed or trenched portion 70 formed within the wall 61 forms an expansion of the cooling hole 60, such that the diameter of the recessed or trenched portion 70 is greater than that of the first aperture diameter 64. Thus, the diameter of the recessed or trenched portion 70 may increase over that of the first aperture diameter 64 in one or more directions both normal to, and relative to, the first axis 62.

FIG. 7a shows a side sectional view of the cooling hole 60 of the type shown in FIG. 6a, inclusive of various forms of debris 75,76,77. As shown in FIG. 7a, debris 75 is shown to have accumulated on the cooling hole sidewall 69. Thus, debris 75 may accumulate within the cooling hole 60 itself. In this way, the debris 70 may be contained within one or more of the cooling holes 60. Thus, the debris 75 may be at least partially contained within the aperture.

Additionally or alternatively, as shown in FIG. 7a and FIG. 7b, debris 75 may least partially cover the first entrance 65. Thus, debris 75 may accumulate at the first entrance 65 at the first end 66 of the cooling hole 60. Additionally or alternatively, debris 75 may accumulate at or towards the second entrance 67 at the second end 68 of the cooling hole 60. Thus, the debris 75 may at least substantially block an entrance 65,67 into one or more of the cooling holes 60. Accordingly, at least a portion of the debris may at least partially cover an entrance of the aperture. As shown, the debris 75 at least partially blocks the cooling hole 60 by extending towards the first axis 62 from the sidewall 69. Additionally or alternatively, the debris 75 at least partially blocks the cooling hole 60 by extending towards the first axis 62 from either or both of the first and second entrance 66,68. As shown in FIG. 7a, the debris 75 only partially blocks the cooling hole 60. In further examples, the debris 75 may completely block the cooling hole 60.

As shown in FIG. 7a and FIG. 7c, the debris 75 is located at multiple locations along either or both of the cooling hole 60 and the recessed or trenched portion 70. In the example shown, two or more instances of debris 75 have accumulated within the cooling hole 60. Thus, the debris 75 may be located at any two or more locations along either or both of the first distance 63 and the recessed or trenched portion 70. In further examples, it will be appreciated that the debris 75 may be located at a single location along the axis 62. Accordingly, the debris 75 may located at one or more locations along the first axis 62.

In further examples, the debris 75 may be located at any one or more locations along either or both of the first distance 63 and the recessed or trenched portion 70. In further examples, the debris 75 may be solely contained within the cooling hole 60. In yet further examples, the debris 75 may be solely contained within the recessed or trenched portion 70.

In FIG. 7a, at least a portion of the debris 75 within the cooling hole 60 comprises a bond coat 76 for a thermal barrier coating 77. In particular, the bond coat 76 comprises platinum. In further examples, the bond coat 76 may comprise a metal or may be metallic. The bond coat 76 may comprise either a NiCrAlY or a NiCoCrAlY alloy. In yet further examples, the bond 76 coat may comprise a precious metal, or may comprise either or both of nickel and platinum aluminides. As shown in FIG. 7a, at least a portion of the debris 75 located within the recessed or trenched portion 70 may be compositionally similar to debris 75 within the cooling hole 60. It will be appreciated that in further examples, at least a portion of debris 75 located within the recessed or trenched portion 70 may be compositionally identical to at least a portion of debris 75 within the cooling hole 60.

In FIG. 7a, at least a portion of the debris 75 located on the recessed or trenched portion 70 comprises a thermal barrier coating 77. In particular, the thermal barrier coating 77 comprises a ceramic. The thermal barrier 77 coating may comprise yttria-stabilised zirconia (YSZ). In further examples, the thermal barrier coating 77 may comprise one or more of mullite; alumina; CeO2 (Ceria)+YSZ; rare earth zirconiates; rare earth oxides, and metal-glass composites. In some examples, at least a portion of the debris 75 located within the cooling hole 60 may be compositionally similar to debris 75 located within the recessed or trenched portion 70. It will be appreciated that in further examples, at least a portion of debris 75 located within the cooling hole 60 may be compositionally identical to at least a portion of debris 75 located within the recessed or trenched portion 70.

Due to the bond coat 76 being applied to the component before that of the thermal barrier coating 77, it will be appreciated that within the cooling hole 60 at or adjacent to either or both of the first and second entrance 65,67, or within the recessed or trenched portion 70, there is a relatively greater likelihood that the debris 75 comprises thermal barrier coating 77 than bond coat 76. Likewise, it will be appreciated that along the axis 62 and towards the centre of the cooling hole 60, there is a progressively greater likelihood that the debris 75 comprises bond coat 76 than thermal barrier coating 77. Furthermore, as shown in FIGS. 7a, 7b, and 7c, the recessed or trenched portion 70 may be at least partially obstructed, or the opening thereinto at least partially reduced, by progressively built layers of the respective bond coat 76 and thermal barrier coating 77.

FIG. 8a shows a side sectional view of the cooling hole 60 shown in FIG. 7a, inclusive of debris 75, which has accumulated at multiple locations within both the cooling hole 60 and the recessed or trenched portion 70. As shown, a tool 78 has been aligned with the cooling hole 60. The tool 78 may be a probe, and may optionally be elongate, comprising one or more sidewalls. The tool 78 may optionally include a visualisation and/or location means such as, for example, a camera for transmitting images or a video feed from an area at or adjacent to the tool 78. The visualisation and/or location means may be optionally integral to the tool 78. However, it will be appreciated that the specific shape or configuration of the tool 78 may vary according to either the specific application, substrate, or component. In the example shown, the tool 78 comprises a tip, the tip comprising a planar end. Thus, the tip shown comprises a substantially flat end. In further examples, the tip may comprise, for example, a rounded end or a profiled end. A beam of energy 80 projects from the tool 78 from either or both of the tip and the sidewall of the tool 78. Thus, the beam of energy 80 interacts with debris 75 which has accumulated on either or both of the cooling hole sidewall 69 and debris 75,76,77 adjacent to either or both of the first and second entrance 65,67. Thus, in the example shown, the beam of energy 80 provides radial machining, also known as reaming, of the debris 75 extending towards the first axis 62 from the sidewall 69. In this way, debris 75 is at least substantially removed from within, or at least partially within, the cooling hole 60.

The beam of energy 80 may project between about 0.01 mm to about 3 mm from the tool 78. In some examples, the beam of energy 80 may project between about 0.1 mm to about 1 mm from the tool 78. In further examples, the beam of energy 80 may project between about 0.2 mm to about 0.6 mm from the tool 78. For example, in the example shown, the beam of energy 80 may project about 0.4 mm from the tool 78. Thus, the beam of energy 80 may project from either or both of the tip and the sidewall of the tool 78. Accordingly, the beam of energy 80 projects from either or both of the tip and the sidewall of the tool 78 over a distance less than or equal to the first distance 63. In further examples, the beam of energy 80 may project from the tool 78 over a distance greater than the first distance 63. In doing so, the beam of energy 80 is provided via the tool 78, and aligned with the first axis 62 such that the beam of energy 80 is coaxially aligned with the cooling hole 60.

In each of the described examples, the beam of energy 80 comprises a diameter which is less than the diameter of the aperture. As shown in FIG. 8a, the beam of energy 80 (shown for illustration purposes only at or in the area adjacent to the tip) comprises a first beam diameter 82 which is less than the first aperture diameter 64. However, it will be appreciated that the specific sizing of beam of energy 80 relative to the diameter of the aperture may vary according to, for example, one or more of the substrate, substrate type, substrate material, quantity of debris, debris material, debris materials, maximum energy input tolerances, or minimum energy input tolerances, and time requirements to achieve the removal of debris from the aperture. The first beam diameter 82 may be between about 0.02 mm to about 6 mm less than the first aperture diameter 64. In some examples, the first beam diameter 82 may be between about 0.2 mm to about 2 mm less than the first aperture diameter 64. In further examples, the first beam diameter 82 may be between about 0.4 mm to about 1.2 mm less than the first aperture diameter 64. For example, in the example shown, the first beam diameter 82 is about 0.8 mm less than the first aperture diameter 64. Thus, in the example shown, there is provided a substantially constant 0.4 mm gap between the tool 78 and the cooling hole sidewall 69.

Referring again to FIG. 8a, the beam of energy 80 comprises an energy sufficient to remove the debris 75. Thus, by exposing the debris 75 to the beam of energy 80, the beam of energy 80 interacts with debris 75 which has accumulated on either or both of the cooling hole sidewall 69 and debris 75,76,77 adjacent to either or both of the first and second entrance 65,67. In the example shown, the tool 78 is an EDM tool, and the beam of energy 80 is provided in the form of an electrical discharge. Thus, the step to remove the debris 75 is achieved by ablation. The electrical discharge may be in the form of one or more of a potential difference, a current discharge, and an electric arc. In particular, the beam of energy 80 may be provided in the form of, for example, a series of rapidly recurring current discharges between two or more electrodes, separated by a dielectric liquid 84, and subject to an electric voltage.

The beam of energy 80 may comprise an on time of between about 1 μs to about 70 μs. In some examples, the beam of energy 80 may comprise an on time of between about 10 μs to about 40 μs. In further examples, the beam of energy 80 may comprise an on time of between about 20 μs to about 30 μs. For example, in the example shown, the beam of energy 80 comprises an on time of 25 μs. The beam of energy 80 may comprise an off time of between about 1 μs to about 500 μs. In some examples, the beam of energy 80 may comprise an off time of between about 10 μs to about 50 μs. In further examples, the beam of energy 80 may comprise an off time of between about 15 μs to about 25 μs. For example, in the example shown, the beam of energy 80 comprises an off time of 20 μs. The beam of energy 80 may comprise a current of between about 0.1 A to about 100 A. In some examples, the beam of energy 80 may comprise a current of between about 1 A to about 50 A. In further examples, the beam of energy 80 may comprise a current of between about 5 A to about 25 A. For example, in the example shown, the beam of energy 80 comprises a current of 10 A. The beam of energy 80 may comprise a gap voltage of between about 0.1V to about 100V. In some examples, the beam of energy 80 may comprise a gap voltage of between about 1V to about 50V. In further examples, the beam of energy 80 may comprise a gap voltage of between about 12V to about 48 A. For example, in the example shown, the beam of energy may comprise a gap voltage of 24 v. In the example shown, the beam of energy 80 comprises a negative polarity. In further examples, the beam of energy 80 may comprise a positive polarity.

Thus, during the step to remove the debris 75, the energy comprised within the beam of energy 80 may be maintained at a substantially constant level, according to a predetermined condition. It will however, be appreciated that in further examples, during the step to remove the debris 75, the energy comprised within the beam of energy 80 may vary, according to a predetermined condition. The predetermined condition may include an energy ramp rate, a period at a substantially constant level, or a cyclic energy level, as required.

In the example shown, the dielectric liquid 84 is provided into the cooling hole 60 around the tool 78 from a supply nozzle 86. In some examples, the dielectric liquid 84 may be provided into the aperture through a channel or orifice formed through the tool 78. In further examples, the turbine blade 47, or the component being processed, may be locally immersed in the dielectric liquid 84 during the step to remove the debris 75. The dielectric liquid 84 may comprise deionized water, or an ionic liquid. In some examples, the dielectric liquid 84 may be replaced with a petroleum jelly. Thus, the step to remove the debris 75 may be achieved by electrical discharge erosion. In this way, debris 75 may be removed from the aperture, following the step to remove the debris 75, within a flow of dielectric liquid directed through the aperture.

In further examples, the beam of energy 80 may be provided in the form of a laser. Thus, the step to remove the debris 75 may be achieved by either or both of melting and vaporisation. In some examples, the step to remove the debris 75 may be achieved by ablation. Thus, the debris 75 may be removed from the aperture, following the step to remove the debris 75, within a flow of fluid directed through the aperture. The fluid may be a gas such as, for example, air.

In further examples, the beam of energy 80 may be in the form of a jet of fluid such as, for example, a jet of water. Thus, the step to remove the debris 75 may be achieved by physically dislodging the debris 75. In this way, the pressure of the water comprised within the jet may be sufficient to physically dislodge the debris 75 and remove it from the aperture. Thus, according to the described examples, the debris 75 may be removed from the aperture, during the step to remove the debris 75, within a flow of fluid directed through the aperture. The fluid may be a liquid such as, for example, water.

In further examples, the step to remove the debris 75 may be achieved by mechanical drilling in accordance with methods well known within the art. Thus, the debris 75 may be removed from the aperture, following the step to remove the debris 75, within a flow of fluid flowing through the aperture. The fluid may be a liquid. The fluid may be water or an aqueous-based coolant. The fluid may be a gas. The fluid may be air.

FIG. 8b shows a side sectional view of the cooling hole 60 shown in FIG. 8a, wherein the tool 78 has been advanced into the cooling hole 60 along the first axis 62. By advancing the tool 78 into the cooling hole 60 along the first axis 62, the debris 75 at the first entrance 65 into the cooling hole 60 has been exposed to the beam of energy 80, and the debris 75 removed in this area. In the example shown, the tool 78 is an EDM tool, and the beam of energy 80 is provided in the form of an electrical discharge. In some examples, the step of advancing the tool 78 into the aperture comprises the step of oscillating the tool 78 within the aperture along the first axis 62. Additionally or alternatively, in further examples, the step of advancing the tool 78 into the aperture comprises the step of rotating the tool 78 within the aperture about the first axis 62.

FIG. 8c shows a side sectional view of the cooling hole 60 shown in FIG. 8a and 8b, wherein the tool 78 has been advanced through the cooling hole 60 along the first axis 62 and subsequently removed. Thus, as is apparent from FIG. 8c, the debris 75 within cooling hole 60 has been exposed to the beam of energy 80, and the debris 75 removed in this area to leave behind a cooling hole 60 which is at least substantially clear of debris 75.

Figure 9:
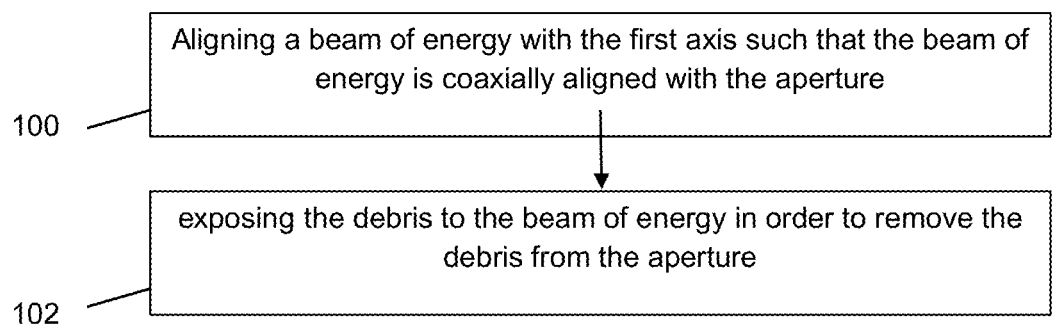

With reference to FIG. 9, there is shown a flow diagram outlining steps to remove debris 75 from within an aperture, wherein the aperture comprises a first aperture diameter 64 and extends along a first axis 62 over a first distance 63. As shown, the method comprises a step 100 of aligning a beam of energy 80 with the first axis 62 such that the beam of energy 80 is coaxially aligned with the aperture. The beam of energy 80 comprises both an energy sufficient to remove the debris 75, and a first beam diameter 82 which is less than the first aperture diameter 64.

The method also comprises a step 102 of exposing the debris 75 to the beam of energy 80 in order to remove the debris 75 from the aperture.

The method may also comprise steps to advance a tool 78 of the type described, into the aperture, along the first axis 62. The method may also comprise steps to withdraw the tool 78 from the aperture, along the first axis 62.

As shown in FIGS. 6a to 8c, the aperture is shown to be provided through a substrate. In the examples shown, the substrate is an exterior wall 61 of a turbine blade 47 of the type shown in FIGS. 4 and 5, and the aperture is a cooling hole 60, provided through the exterior wall 61 of the turbine blade 47. However, it will be appreciated that in further examples, the aperture may not be a cooling hole 60, but a hole provided through or within a substrate, such as an aerofoil. In further examples, it will be appreciated that the aperture may instead be a channel provided upon or within a substrate. Alternatively, the aperture may be a recess, trench, or groove provided upon or within a substrate. Further alternatively, the substrate may, in further examples, be a body comprising an aperture, for which the removal of debris 75 is required.

It will also be appreciated that in situations where the substrate comprises a plurality of apertures, such as in the example of a turbine blade 47 comprising a plurality of cooling holes 60, each respective cooling hole 60 comprises a respective first aperture diameter 64 and extends along a respective first axis 62 over a respective first distance 63. Thus, the step to remove the debris 75 is completed for each aperture which is at least partially blocked by the debris 75. In this way, debris 75 may be removed from two or more of the respective apertures sequentially, in a preferred sequence or order, or from two or more of the respective apertures concurrently.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for removal of debris from an existing aperture, the aperture comprising a first aperture diameter and extending along a first axis, defined by the existing aperture, over a first distance, the method comprising the steps of:
   aligning a beam of energy with the first axis such that the beam of energy is coaxially aligned with the existing aperture, the beam of energy comprising both an energy sufficient to remove the debris, and a first beam diameter which is less than the first aperture diameter; and
   exposing the debris to the beam of energy in order to remove the debris from the existing aperture and wherein at least a portion of the debris at least partially covers an entrance of the existing aperture, the step of exposing the debris to the beam of energy including the step of removing the debris from an entrance into the existing aperture.

2. The method as claimed in claim 1, wherein the existing aperture is through a substrate, the first distance being equal to or less than a thickness of the substrate.

3. The method as claimed in claim 1, wherein the existing aperture is through a substrate, the first distance being greater than a thickness of the substrate.

4. The method as claimed in claim 1, comprising maintaining the energy comprised within the beam at a substantially constant level, according to a predetermined condition.

5. The method as claimed in claim 1, comprising varying the energy comprised within the beam, according to a predetermined condition.

6. The method as claimed in claim 2, wherein the substrate comprises a plurality of existing apertures, each of the existing apertures comprising a first aperture diameter and extending along a first axis over a first distance.

7. The method as claimed in claim 6, wherein the method is completed for each of the existing apertures which is at least partially blocked by the debris.

8. The method as claimed in claim 1, wherein the first aperture diameter is at least substantially constant over at least a substantial portion of the first distance.

9. The method as claimed in claim 1, wherein the first beam diameter is between 0.02 mm to 6 mm less than the first aperture diameter.

10. The method as claimed in claim 1, wherein the beam of energy is provided via a tool.

11. The method as claimed in claim 10, wherein the method comprises advancing the tool into the existing aperture along the first axis.

12. The method as claimed in claim 11, wherein the advancing the tool into the existing aperture comprises oscillating the tool within the existing aperture along the first axis.

13. The method as claimed in claim 11, wherein the advancing the tool into the existing aperture comprises rotating the tool within the existing aperture about the first axis.

14. The method as claimed in claim 10, wherein the tool is an electro discharge machining (EDM) tool.

15. The method as claimed claim 14, wherein the beam of energy is an electrical discharge.

* * * * *